United States Patent [19]

Gowan

[11] 4,426,131
[45] Jan. 17, 1984

[54] REPLACEABLE DIFFRACTION GRATINGS FOR COOLED LASER OPTICS

[75] Inventor: John G. Gowan, London, England

[73] Assignee: The United States of America as represented by the Secretary of the Air Force, Washington, D.C.

[21] Appl. No.: 339,206

[22] Filed: Jan. 13, 1982

[51] Int. Cl.³ .............................................. G02B 5/18
[52] U.S. Cl. ................................................... 350/162.2
[58] Field of Search ........................ 350/162.17, 162.2

[56] References Cited

U.S. PATENT DOCUMENTS

| | | | |
|---|---|---|---|
| 3,836,236 | 9/1974 | Kirk et al. | 350/310 |
| 3,865,472 | 2/1975 | Hobart et al. | 350/310 |
| 4,114,978 | 9/1978 | Bostick et al. | 350/1.7 |

Primary Examiner—Bruce Y. Arnold
Attorney, Agent, or Firm—Donald J. Singer; Bobby D. Scearce

[57] ABSTRACT

An improved optical diffraction grating for high power laser systems is described which comprises a disk or wafer of suitable material, such a single crystal silicon, having on one side thereof the desired grating lines and pattern, the other side thereof abutting the surface of the heat exchanger or other supporting substructure and being held thereon by vacuum means.

2 Claims, 1 Drawing Figure

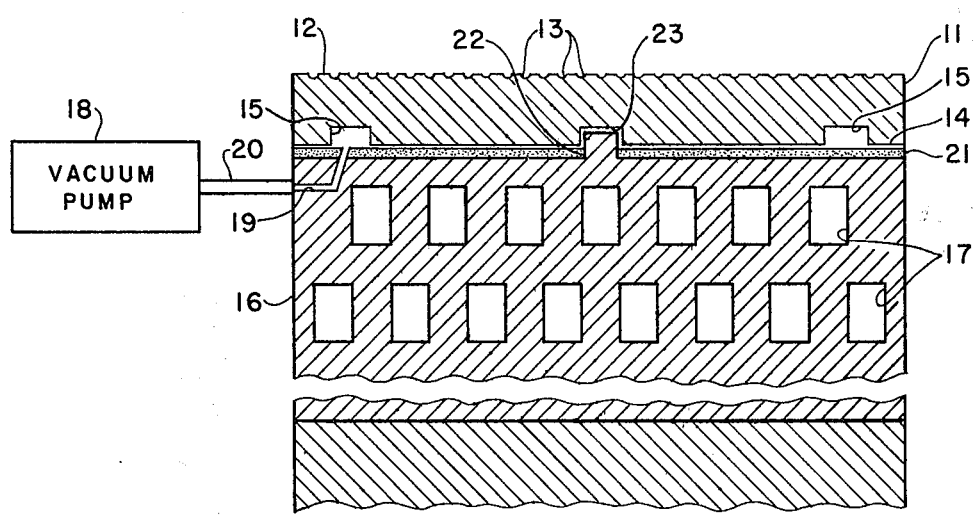

REPLACEABLE DIFFRACTION GRATINGS FOR COOLED LASER OPTICS

RIGHTS OF THE GOVERNMENT

The invention described herein may be manufactured and used by or for the Government of the United States for all governmental purposes without the payment of any royalty.

BACKGROUND OF THE INVENTION

This invention relates generally to improvements in optical diffraction gratings, and more particularly to improved optical diffraction gratings for high energy laser applications.

Diffraction gratings are essential for effective beam tuning for high energy laser systems. These gratings conventionally comprise, for example, thin disks of silicon or the like, engraved with precision rulings to provide a surface having the desired grating pattern of finely spaced, shallow grooves. The shape, depth and pattern of the grooves characterize the performance of the grating. Use of the gratings often results in deterioration or other damage to the grooves comprising the grating. Cleaning or otherwise salvaging a deteriorated grating is extremely difficult, and it usually must be returned to the manufacturer for refurbishing. Since conventional gratings are ruled, etched, or engraved into the faceplates of, or integral with, a heat exchanger or other supporting structure, the number of times a grating may be refurbished is limited, and, upon expiration of the usefulness of the grating, the substantially more expensive heat exchanger structure may have to be sacrificed. Further, cooling channel distortions in the grating surface which may be polished out of a mirror surface having similar supporting structure may not be removed from a conventional grating configured integrally with the heat exchanger or other substructure.

The novel replaceable diffraction grating of the present invention is configured to be disposable and replaceable, thereby avoiding the need for the substantially more expensive conventionally used device. The novel configuration for the grating of the present invention may be provided of single crystal silicon disk up to about 12 inches (30.48 centimeters) in diameter, and can be removeably held to a heat exchanger/substrate assembly by vacuum. The novel configuration of the present invention obviates the consideration of closely matching the thermal properties of the grating and substructure materials. Replacement of a deteriorated grating is thereby greatly facilitated, resulting in substantially less downtime for replacement as compared to that necessary to replace conventionally configured grating devices. In addition, the novel grating of this invention may include means to quickly and conveniently align the replaceable grating.

It is, therefore, an object of the present invention to provide an improved optical diffraction grating for high energy laser systems.

It is a further object of the present invention to provide an improved high energy laser diffraction grating which is disposable and easily replaceable in the laser system.

These and other objects of the present invention, as might occur to one with skill in the field of this invention, will become apparent as the detailed description of a representative embodiment thereof proceeds.

SUMMARY OF THE INVENTION

In accordance with the foregoing principles and objects of the present invention, an improved optical diffraction grating for high power laser systems is described which comprises a disk or wafer of suitable material, such as single crystal silicon, having on one side thereof the desired grating lines and pattern, the other side thereof abutting the surface of the heat exchanger or other supporting substructure and being held thereon by vacuum means.

DESCRIPTION OF THE DRAWINGS

The invention will be more clearly understood from the following detailed description of a representative embodiment thereof read in conjunction with the accompanying drawing which is a schematic view in cross section illustrating one embodiment of the novel replaceable diffraction grating of this invention together with a form of heat exchanger to which it may be conveniently attached.

DETAILED DESCRIPTION

Referring now to the drawing, depicted therein is a schematic cross-sectional view of the novel replaceable diffraction grating device of the present invention. The grating device may comprise a grating disk 11 of single crystal silicon. Other materials for disk 11 are appropriate for the purpose as long as they possess physical properties suitable for high power devices. However, single crystal silicon was found preferred for the grating device herein described. Disk 11, comprising a suitably thin, high purity, high thermal conductivity, single crystal silicon wafer of the desired diameter may be first obtained commercially. Such disks 11 satisfactory for application herein may be produced by known methods such as the "Czochralski" method, wherein the crystals are seeded and drawn from a melt of silicon. Orientation of the seed crystal determines orientation of the boule. Sectioning of the boule perpendicular to the direction of draw produces single crystal plates with a particular set of crystallographic planes exposed. The disks 11 may be provided in any desired thickness as appropriate to the invention herein, however, disk 11 thickness will depend on the power dissipation requirements of the heat exchanger. The higher the power, the thinner the plate. Thicknesses of 0.5 mm and less will normally be required. Since there is no requirement for mechanical strength or stiffness, the thickness of the plate is limited only by the precision of the boule slicing apparatus.

The surface 12 of disk 11 exposed to laser radiation is provided with an etched grating in the form of a plurality of grating lines or grooves 13 of the desired shape, width, depth and spacing for the intended function. The shape and depth of the grooves 13 are critical to the performance of the grating device, and may be produced upon the surface 12 of disk 11 by known etching or engraving processes.

The surface 14 of disk 11 opposite surface 12 may be provided with a vacuum groove or slot such as shown as annular slot 15. Annular slot 15, outside the required clear aperture of the grating device, may be provided by any convenient means as would occur to one with skill in the field of this invention such as by chemical milling, using a technique similar to that used to produce the grating lines 13.

The supporting structure for disk 11 may be in the form of heat conducting substructure including a heat exchanger 16 having a plurality of passageways 17 provided therein for conducting fluid coolant therethrough during operational use of the grating device. The heat exchanger may be of any desired configuration having a surface adjacent disk 11 of the desired and substantially precisely matching contour. The heat exchanger 16 is the most costly component of the cooled grating configuration illustrated in the drawing, and may be constructed according to processes outside the scope of this invention. A suitable process for constructing heat exchanger 16 for use in conjunction with the grating device of this invention may be as described in the copending application for Letters Patent entitled "Hot Pressed and Diffusion Bonded Laser Mirror Heat Exchanger", Ser. No. 339,260, filed Jan. 13, 1982, each assigned to the assignee hereof. Means are provided near grating disk 11 whereby annular vacuum slot 15 may communicate with a vacuum provided by a vacuum pump 18. As shown in the drawing, this means may be drilled vacuum passageway 19, provided in substrate 16, connected by suitable connecting means (not shown) through vacuum line 20 to vacuum pump 18.

Disk 11 may be held to heat exchanger 16 by a vacuum drawn on annular vacuum slot 15 to hold surface 14 of disk 11 in contact with the mating surface of heat exchanger 16. Thermal contact and prevention of air leakage around the edges of the mating surfaces of disk 11 and heat exchanger 16 may be effected by using a thin layer 21 of high thermal conductivity paste such as might be used conventionally to provide the desired vacuum seal.

The interfacing surfaces of disk 11 and heat exchanger 16 may be provided with suitable indexing means to align disk 11 with heat exchanger 16, to prevent inadvertent slippage of disk 11 thereon and to allow for mismatch in thermal expansion coefficients therebetween. As shown in the drawing, the indexing means may comprise ridges or tabs provided at any appropriate location on the surface of heat exchanger 16 such as radially extending indexing tab 22 to mate with an indexing slot 23 which may be provided in surface 14 of disk 11. Any suitable size, shape, and number of indexing tab 22 and indexing slot 23 combinations may be provided as would be consistent with structural and functional requirements of the grating disk 11, however, at least three radial slots spaced 120° apart will probably be required. For substantially exact surface matching of the disk 11 and heat exchanger 16, it may be desirable to single point diamond turn the respective mating surfaces. In such a case, minimum or no paste 21 will be required. Disk 11 may therefor be easily removed, replaced, and aligned without replacing the heat exchanger 16.

There is, therefore, described herein an improved optical diffraction grating for use in high energy laser system applications. It is understood that certain modifications to the invention as hereinabove described may be made, as might occur to one with skill in the field of this invention, within the scope of the appended claims. Therefore, all embodiments contemplated hereunder have not been shown in complete detail. Other embodiments may be developed without departing from the spirit of this invention or from the scope of the appended claims.

I claim:

1. An optical diffraction grating device, for a high energy laser system having a cooled surface for supporting laser optics, which comprises:
   a. a thin disk of substantially single crystal silicon having substantially flat, parallel first and second surfaces;
   b. a plurality of grating lines on said first disk surface;
   c. an annular groove on said second disk surface; and,
   d. vacuum means, communicating with said groove, for holding said second disk surface in substantial contact with said cooled surface of said laser system.

2. The optical diffraction grating device as recited in claim 1 further comprising an alignment groove on said second disk surface, and a mating alignment tab on said cooled surface, for reproducibly positioning said disk relative to said cooled surface.

* * * * *